United States Patent
Reich

(10) Patent No.: US 10,239,213 B1
(45) Date of Patent: Mar. 26, 2019

(54) FLEXURE ASSEMBLY FOR FORCE/TORQUE SENSING

(71) Applicant: X Development LLC, Mountain View, CA (US)

(72) Inventor: Adam Reich, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 180 days.

(21) Appl. No.: 15/226,387

(22) Filed: Aug. 2, 2016

Related U.S. Application Data

(60) Provisional application No. 62/259,376, filed on Nov. 24, 2015.

(51) Int. Cl.
*B25J 13/08* (2006.01)
*B25J 9/16* (2006.01)

(52) U.S. Cl.
CPC .......... *B25J 13/085* (2013.01); *B25J 9/1633* (2013.01); *B25J 9/1638* (2013.01)

(58) Field of Classification Search
CPC ........ B25J 9/1656; B25J 9/0087; B25J 13/02; B25J 9/1676; B25J 9/1633; B25J 13/085; B25J 19/0095; B25J 9/1666; B25J 9/1682; Y10S 901/14; Y10S 901/49; Y10S 901/02; G01L 5/0066; G01L 3/108; G01L 1/225; G01L 25/003; G05B 2219/39024; G05B 2219/39529; G05B 19/41815; G05B 2219/39083; G05B 2219/40475; G05B 2219/40477; G05B 2219/39135

See application file for complete search history.

(56) References Cited

U.S. PATENT DOCUMENTS

| | | | |
|---|---|---|---|
| 3,960,013 A * | 6/1976 | Ormond | G01L 1/2231 177/211 |
| 4,099,409 A | 7/1978 | Edmond | |
| 4,823,618 A | 4/1989 | Ramming | |
| 5,648,617 A * | 7/1997 | Cullen | G01L 1/2231 73/862.042 |
| 6,253,626 B1 | 7/2001 | Shoberg et al. | |
| 6,269,702 B1 | 8/2001 | Lambson | |
| 6,694,828 B1 * | 2/2004 | Nicot | B62D 1/16 180/422 |

(Continued)

OTHER PUBLICATIONS

Caroline Jacq, Barthelemy Luthi, Thomas Maeder, Olivier Lambercy, Roger Gassert, Peter Ryser, Thick-film multi-DOF Force / torque sensor for wrist rehabilitation, Aug. 2010, Sensors and Actuators A, vol. 162, No. 2, p. 361-366, published by Elsevier.

(Continued)

*Primary Examiner* — Lisa M Caputo
*Assistant Examiner* — Brandi N Hopkins
(74) *Attorney, Agent, or Firm* — McDonnell Boehnen Hulbert & Berghoff LLP

(57) ABSTRACT

An example device includes a first flexural element, a second flexural element, a first rigid component and a second rigid component. The rigid components have a fixed height that axially offsets the first flexural element from the second flexural element. The first rigid component is coupled to the first flexural element at one or more connection points on a first plane and coupled to the second flexural element at one or more connection points on a second plane. The second rigid component is coupled to the first flexural element at one or more other connection points on the first plane and coupled to the second flexural element at one or more other connection points on the second plane.

20 Claims, 9 Drawing Sheets

(56) References Cited

U.S. PATENT DOCUMENTS

| | | | |
|---|---|---|---|
| 6,871,552 B2 | 3/2005 | Liu et al. | |
| 7,121,147 B2 | 10/2006 | Okada | |
| 7,360,456 B2 | 4/2008 | Morimoto | |
| 8,161,827 B2 | 4/2012 | Kato et al. | |
| 8,726,741 B2 | 5/2014 | Krippner et al. | |
| 8,776,616 B2 | 7/2014 | Szasz et al. | |
| 8,943,902 B2 | 2/2015 | Bosscher et al. | |
| 8,965,577 B2 | 2/2015 | Arimitsu | |
| 9,038,484 B2 | 5/2015 | Seibold | |
| 2010/0164873 A1* | 7/2010 | Senft | G01D 5/34 345/170 |
| 2011/0107850 A1* | 5/2011 | Kim | G01L 5/16 73/862.041 |
| 2013/0014595 A1* | 1/2013 | Huizinga | B60T 17/22 73/862.045 |
| 2014/0174239 A1* | 6/2014 | Nagata | B25J 13/085 74/490.01 |
| 2015/0260591 A1* | 9/2015 | Wu | G01L 5/161 73/862.045 |
| 2017/0211999 A1 | 7/2017 | Bradford et al. | |

OTHER PUBLICATIONS

HEX-58-RE-400N 6-Axis Force Sensor Data Sheet, OptoForce, http://optoforce.com/wp-content/uploads/2014/03/HEX-58-RE-400N-DATASHEET-1.41.pdf.

HEX-70-CE-2000N 6-Axis F/T Sensor Data Sheet, OptoForce, http://optoforce.com/wp-content/uploads/2014/03/HEX-70-CE-2000N-DATASHEET-1.41.pdf.

HEX-70-CG-1000N 6-Axis F/T Sensor Data Sheet, OptoForce, http://optoforce.com/wp-content/uploads/2014/03/HEX-70-CG-1000N-DATASHEET-1.41.pdf.

HEX-70-CH-4000N 6-Axis F/T Sensor Data Sheet, OptoForce, http://optoforce.com/wp-content/uploads/2016/09/HEX-70-CH-4000N-DATASHEET-1.5.pdf.

HEX-70-XE 6-Axis F/T Sensor Data Sheet, OptoForce, http://optoforce.com/wp-content/uploads/2014/03/HEX-70-XE-DATASHEET.pdf.

FT 150 Force Torque Sensor, RobotIQ, http://robotiq.com/wp-content/uploads/2014/09/Robotiq-Force-Torque-Sensor-FT-150-Specifications.pdf.

Capacitive F/T Transducer Model 200, Low-Cost Six Axis Force/Torque Sensor Data Sheet, ATI Industrial Automation, Aug. 2015 http://www.ati-ia.com/Library/documents/Capacitive%20FT200.pdf.

HEX-70-XG 6-Axis F/T Sensor Data Sheet, OptoForce, Jun. 28, 2016, http://pdf.directindustry.com/pdf/optoforce-ltd/hex-7-0-x-f/125451-667819.html 6-Axis Force / Moment Sensor FT, Schunk, Apr. 21, 2015 https://us.schunk.com/fileadmin/pim/docs/IM0018179.PDF Ft 300 Force Torque Sensor, RobotIQ, Jun. 14, 2016, http://robotiq.com/wp-content/uploads/2016/01/specsheet-FT300-Final-web.pdf.

Schunk FTC-050 Force Sensor Data sheet, available at least as of Dec. 9, 2008.

* cited by examiner

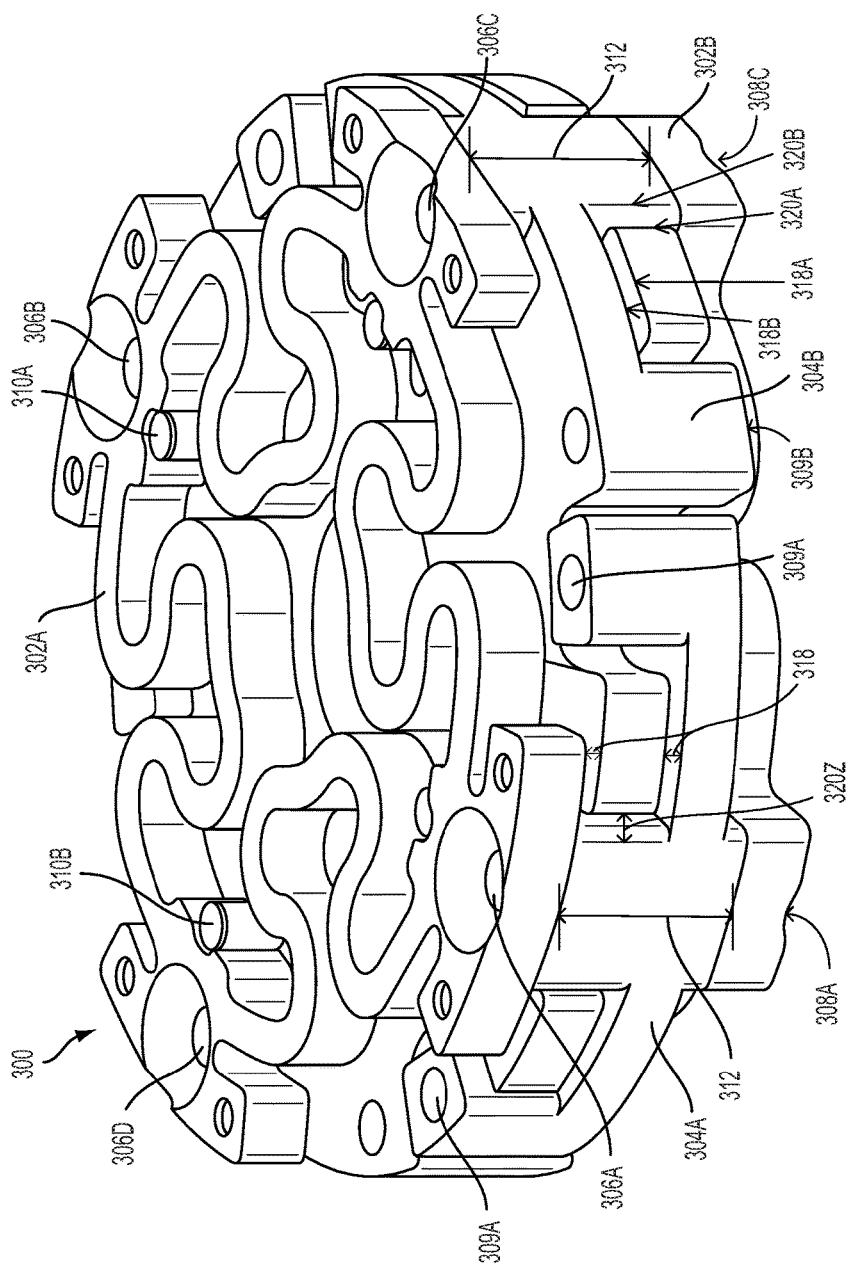

FLEXURE ASSEMBLY FOR FORCE/TORQUE SENSING

CROSS-REFERENCE TO RELATED APPLICATION

This application claims the benefit of U.S. Provisional Application No. 62/259,376, filed Nov. 24, 2015, which is explicitly incorporated by reference herein in its entirety.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

The present application discloses implementations that relate to devices, systems and methods that may include a flexure assembly device as part of a force/torque sensing system. Devices described herein may include a first flexural element, a second flexural element, a first rigid component, and a second rigid component. Each of the flexural elements may be coupled to each of the rigid components such that when a load is applied to at least one of the rigid components the first and the second flexural element may provide resistance to at least one of the rigid components. In some implementations a sensor may measure the deflection of the rigid components. Within examples, the force/torque sensing system may then determine at least one component of the forces and moments based on the measured deflection.

In at least one embodiment, a device is described. The device includes a first flexural element, a second flexural element, a first rigid component and a second rigid component. The flexural elements are centered on an axis. Furthermore, the rigid components may have a fixed height that axially offsets the first flexural element from the second flexural element. The first rigid component is coupled to the first flexural element at one or more connection points on a first plane and coupled to the second flexural element at one or more connection points on a second plane. The second rigid component is coupled to the first flexural element at one or more other connection points on the first plane and coupled to the second flexural element at one or more other connection points on the second plane. The first and the second planes are perpendicular to the axis.

In another embodiment, a method is described. The method includes a first flexural element and a second flexural element resisting an applied load. A first rigid component is coupled to the first flexural element at one or more connection points on a first plane, and further the first rigid component is coupled to the second flexural element at one or more connection points on a second plane. A second rigid component is coupled to the first flexural element by one or more other connection points on the first plane, and further the second rigid component is coupled to the second flexural element by one or more other connection points on the second plane. The first flexural element is spaced from the second flexural element by a fixed height of the first and second rigid components. The method further includes at least one sensor determining at least one output parameter based on one or more deflections of the first rigid component relative to the second rigid component when the load is applied.

In yet another embodiment, a system is described. The system includes a first flexural element, a second flexural element, a first rigid component and a second rigid component. The flexural elements are centered on an axis. Furthermore, the rigid components may have a fixed height that axially offsets the first flexural element from the second flexural element. The first rigid component is coupled to the first flexural element at one or more connection points on a first plane and coupled to the second flexural element at one or more connection points on a second plane. The second rigid component is coupled to the first flexural element at one or more other connection points on the first plane and coupled to the second flexural element at one or more other connection points on the second plane. The system further includes a first housing component that is coupled to the first rigid component and a second housing component that is coupled to the second rigid component. In addition, the system includes one or more processors that execute program instructions causing the system to perform functions including receiving sensor data from one or more sensors that indicates one or more deflections of the rigid components resulting from an applied load, and determining at least one component of the forces and moments of the applied load based on the one or more measured deflections.

In yet another aspect, another system is described. The system includes means for resisting, by a first flexural element and a second flexural element, an applied load. A first rigid component is coupled to the first flexural element at one or more connection points on a first plane, and further the first rigid component is coupled to the second flexural element at one or more connection points on a second plane. A second rigid component is coupled to the first flexural element by one or more other connection points on the first plane, and further the second rigid component is coupled to the second flexural element by one or more other connection points on the second plane. The first flexural element is spaced from the second flexural element by a fixed height of the first and second rigid components. The system also includes means for determining, by at least one sensor, at least one output parameter based on one or more deflections of the first rigid component relative to the second rigid component when the load is applied.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 3A and 3B illustrate an example flexure assembly, according to an example embodiment.

DETAILED DESCRIPTION

Figure 1:
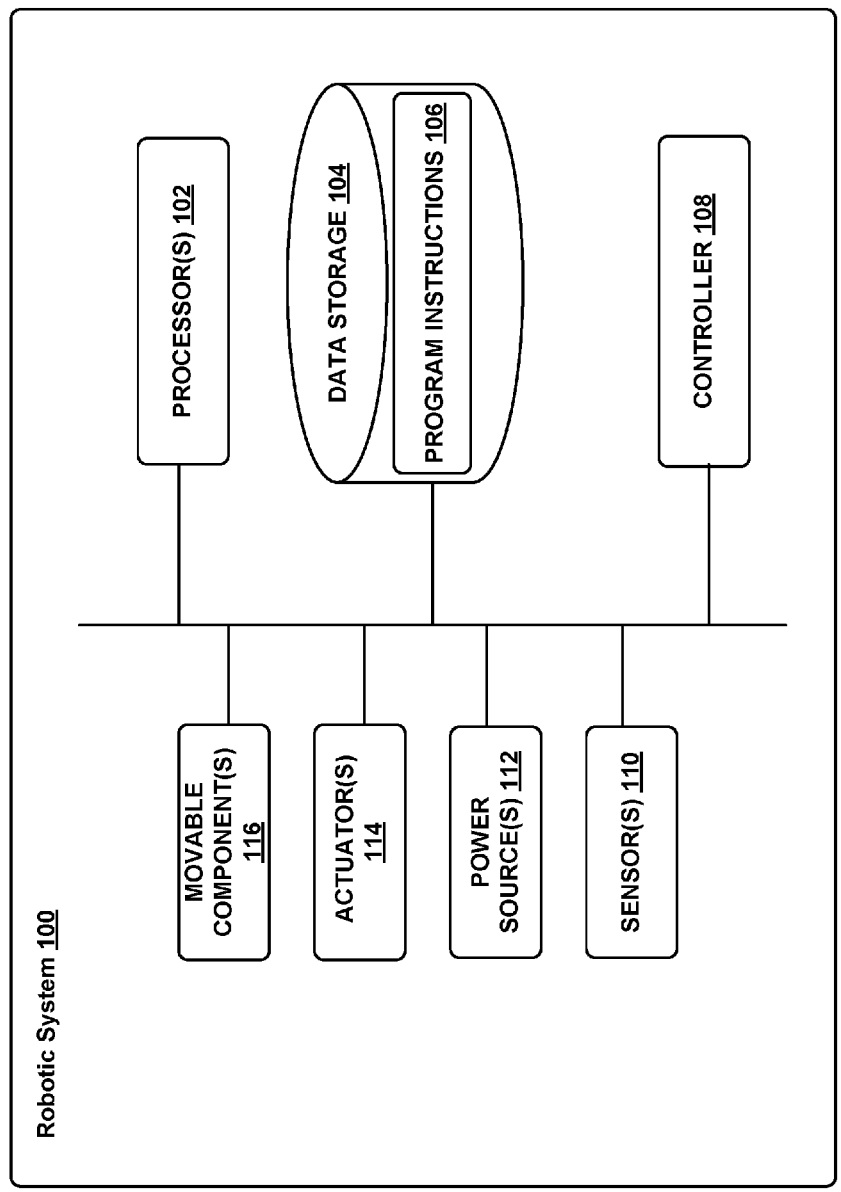
FIG. 1 illustrates an example configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Robotics are increasingly being applied to more widespread applications, finding uses in industrial, hospital, home and commercial environments. Force/torque sensing capabilities are a useful resource for enabling implementation of various behaviors which require haptic feedback, and also for providing a safe and compelling user-experience when interfacing with people. An enabling trend in the growing ubiquity of robots is the gradual introduction of lower-cost and more human-safe technologies. Despite this, force/torque sensors available commercially remain quite costly, and consequently are not feasible for integration in very-low cost systems.

Specifically, availability of a six-axis (or six degrees-of-freedom) force/torque sensor at lower prices relative to existing technologies may enable a wide range of applications which do not justify the costs of current force/torque sensing options. In addition to strain gage based sensors (which may be quite costly), there has been a recent emergence of displacement-based sensors using various technologies such as optical and capacitive approaches. The currently available versions of these displacement-based sensors tend to be too large in size for use in small robotic systems, and remain cost-prohibitive for certain applications. Some of the available options have overload capacities which top out at two to five times full scale, which may not be robust enough for some applications, while other options utilize elastomeric flexures, which are subject to creep and hysteresis which limit the measurement accuracy.

Displacement-based sensors may rely upon the use of at least one flexural element within a flexure assembly to provide a repeatable relationship between applied load and resultant deflection. The resultant deflection may indicate one or more components of position and/or orientation of components of a flexure assembly. Further, the resultant deflection, or just deflection, may include linear and/or rotational displacement of components of the flexure assembly within a displacement-based sensor. Within examples, the deflection may be considered a relative position between components of the flexure assembly. As the flexure is made smaller, the resultant deflection tends to decrease (maintaining a comparable degree of deflection would necessitate design changes which result in higher stresses). For optimal performance of a sensor, it may be desirable that the magnitude of deflections of the sensing elements is roughly equal for each full-scale component load. Furthermore, the deflection provided by the sensor may need to be sufficient to provide the desired measurement resolution as dictated by the sensing technology and application. The resultant need for relatively high deflections, high overload capacity, all within a small footprint poses a unique engineering challenge.

An example flexure assembly may be used as part of a six-axis force/torque sensor (e.g., for a commercial robotic mobile manipulator). A flexure assembly may include rigid components that are configured to move relative to one another in six degrees-of-freedom such that any resulting deflection between the two rigid components may be determined by a sensor, such as a displacement sensor. The rigid components may be coupled to at least one flexural element that is designed to resist a load applied on the flexure assembly beyond a resting zero-load position. In some aspects, the at least one flexural element may permit deflection between the rigid components when a load is applied to the flexure assembly. Within examples, a flexural element may be considered a spring.

In at least one embodiment, a flexure assembly may include two opposing flexural elements and two complementary rigid components. As such, in at least one aspect, the design may include only two unique parts that need to be manufactured, thus potentially lowering the cost while maintaining production at a high volume.

Within examples, the two opposing flexural elements may be on outermost or far ends of the flexure assembly, while the two complementary rigid components may be within an inner portion of the flexure assembly. In at least one embodiment, the two complementary rigid components may interlace with each other such that the two opposing flexural elements on either far end of the flexural assembly are offset from one another by the height of the rigid components. Described in further detail below, interlacing the two complementary rigid components allows for a more compact design and integration of mechanical hard stops directly into the flexure assembly without any additional components. By using two opposing flexural elements, offset by the rigid components that include integrated mechanical hard stops, the flexure assembly may be more robust and sensitive in six degrees-of-freedom.

The flexural element(s) may have a different desirable stiffness depending on the designed use of the force/torque sensor that may include a designed range of load magnitudes the sensor may experience or be configured to measure. The stiffness of the flexural elements may be based on the design (i.e. shape and dimensions) along with the modulus of elasticity of the material chosen for the flexural element. A high modulus of elasticity is sought when deflection is undesirable, while a low modulus of elasticity is required when flexibility is needed. Knowing the stiffness of the flexural elements as well as measuring the deflection of the rigid components relative to each other may allow a system to calculate the resultant forces experienced by the flexure assembly when a load is applied to the system.

A stiffness matrix, which includes stiffness entries or elements for six degrees-of-freedom, may define or model the overall stiffness of the flexural element(s) or the flexure assembly. As such, a flexure assembly design that includes two opposing flexural elements and two complementary rigid components, may allow for tuning or control of the stiffness matrix in six degrees-of-freedom. For example, the design may provide the ability to effectively adjust each element of the stiffness matrix, where the elements may include a stiffness along an X-axis, a stiffness along a Y-axis, a stiffness along a Z-axis, a stiffness in bending about the X-axis, a stiffness in bending about the Y-axis and a stiffness in bending about the Z-axis. In one embodiment, tuning the stiffness matrix may include reducing an amount of deflection due to moments about the X-axis and/or the Y-axis, while maintaining deflections from axial forces along the Z-axis. As such, by using two opposing flexural elements, offset by the rigid components that include the integrated mechanical hard stops, the flexure assembly design may allow for precise tuning of the stiffness matrix of the flexure assembly in six degrees-of-freedom. Tuning of the stiffness matrix may allow for additional control over the magnitude of deflections and movement between rigid components of the flexure assembly.

An axial force applied on the flexure assembly may cause linear deflections or displacements of one rigid component relative to the other; a moment applied on the flexure assembly may cause rotation or angular displacement of on rigid component relative to the other. Within examples, deflection of one rigid component relative to another may be measured at fixed points of the rigid components that are not coincident with the center of rotation and that are located a distance away from the center of rotation, such that an induced rotation of the rigid components may result in apparent translation to a sensing element. Thus, the deflection from forces as well as moments may be measured in meters, for example.

Within examples, a six degree-of-freedom force/torque displacement sensor may have design loads and desired deflections based upon the designed applications or environments for the sensor. For example, within an environment, the force/torque sensor may be designed for six degrees-of-freedom, where $F_x$, $F_y$ and $F_z$ represent the component forces in three directions and $M_x$, $M_y$ and $M_z$ represent the components of the moments about each axis. The design loads for each of the force and moment components may be $F_x=F_y=F_z=100$ newtons ("N"), $M_x=M_y=4$ newton-meters ("Nm"), and $M_z=2.5$ Nm. The desired deflections (represented by $d_x$, $d_y$, $d_z$ in each of the three directions) resulting from an applied load may include ranges of deflections. For example, the desired deflections from $F_x$, $F_y$ and $F_z$ may be 0.1 mm<$d_x$, $d_y$, $d_z$<0.3 mm, the desired deflections from $M_x$ and $M_y$ may be 0.1 mm<$d_z$<0.3 mm, and the desired deflections of $M_z$ may be 0.1 mm<$d_x$, $d_y$<0.3 mm.

Considering the design loads and range of desired displacements, a design stiffness of a flexural element (or elements) may be approximated and a geometry or shape of the flexural element may then be designed. The flexural element design may be tested and possibly optimized using a range of finite element analysis techniques. Within a linear model, the design stiffness ("k") may be calculated from the equation:

$$k = \frac{F}{d} \text{ or } k = \frac{M}{d \cdot a}$$

where "F" describes the force(s), "d" describes the displacement(s), "M" describes the moment(s) and "a" describes a moment arm (i.e. distance away from an axis upon which the force is acting). "F," "d," "M," "a" and "k" may also be represented in matrix form and include components in each direction.

As such, within examples, when a load is applied to the flexure assembly, one or more deflections of the rigid components may be measured by one or more sensors, and by approximating or determining the stiffness coefficient(s) of the flexural element(s), at least one component of the forces and/or moments may be determined using the relationships described above.

Within some examples, deflection may not need to be computed and instead, direct signals from the sensor may be mapped to force magnitudes. For example, raw voltages, frequencies or other output signals or parameters from sensing elements may be measured after applying known loads to the flexure assembly. A model or direct mapping may then be created using the known applied loads and the measured sensor outputs. Utilizing this calibration process to create a direct correlation of sensor output to known loads, unknown forces and/or torques may be determined directly from the sensor output signal(s). Within other examples, outputs from the sensor may be mapped directly to other output parameters such as position or orientation of a robot system.

The output signals from the sensing elements of the flexural assembly may be dependent on deflections (or displacements) of flexure assembly components, and the deflections may depend on the loads applied to the flexure assembly. As such, for example, deflections ("d") may be a function of volts ("V," as an example output signal of the sensing elements): d=f(V). Deflection may have a linear, polynomial or other relationship to volts within specific examples. Continuing, an applied load ("F") may be a function of deflection: F=g(d). Similarly, applied loads may have a linear, polynomial or other relationship to deflection within specific examples. Thus, rather than determining both f(V) and g(d), calibration data previously collected and modeled may be used to directly model the resulting force ("R"), R=h(V), where h(V)=g(f(V)).

The design of the flexure assembly and associated components may provide cost efficiency and space efficiency for placement in the wrist of a robotic device. In further examples, the design may be used by robot accessory manufacturers for applications of low-cost robotic systems in unstructured or changing environments. The design may also be employed in input devices for gaming, or in medical applications for measuring forces applied by a patient during recovery of motor skills and muscular strength following a stroke or other incident, etc.

II. Example Robotic Systems

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
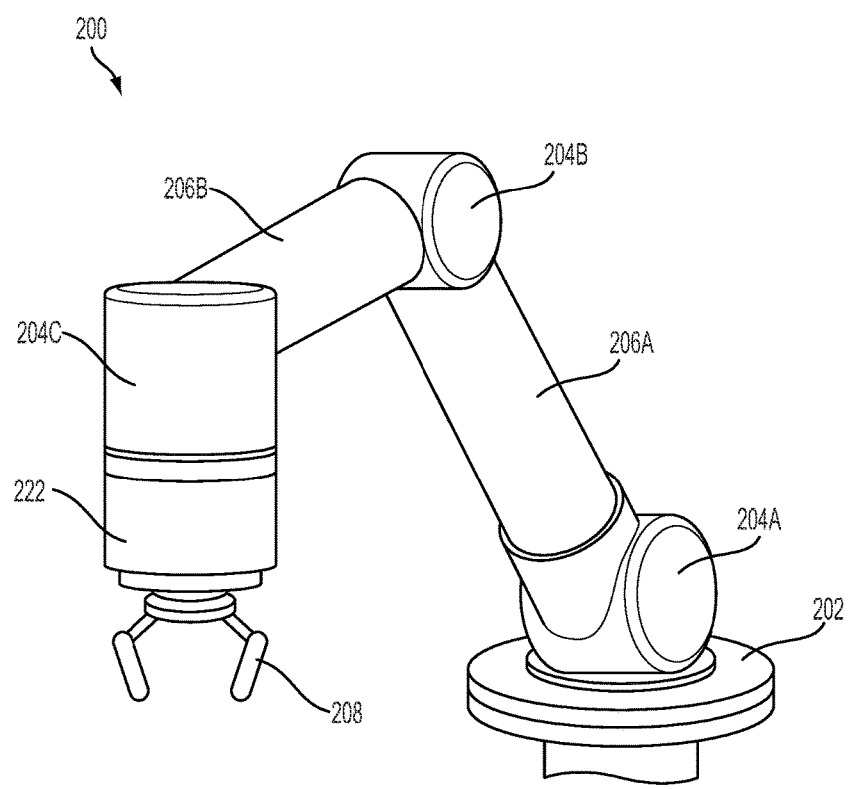
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204C each coupled to one or more of the actuator(s) 114. The actuators in joints 204A-204C may operate to cause movement of various movable component(s) 116 such as appendages 206A-206B and/or end effector 208. For example, the actuator in joint 204B may cause movement of appendage 206B and the actuator in joint 204C may cause movement of the end effector 208. Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

As illustrated in FIG. 2, the robotic arm 200 may also include a sensor housing 222. The sensor housing 222 is shown between joint 204C and the end effector 208, but may also be located between other components of robotic arm 200. The sensor housing 222 may include sensors, such as sensor(s) 110 from FIG. 1. The sensor housing 222 may also include mechanical and/or electrical components that are configured to receive inputs from other components of the robotic arm 200. In one example, the sensor housing 222 may include a flexure assembly and a sensor assembly configured to measure a deflection caused when a load is applied on some component of the robotic arm 200, such as on the end effector 208.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. Example Flexure Assemblies for a Force/Torque Sensor

Figure 3B:
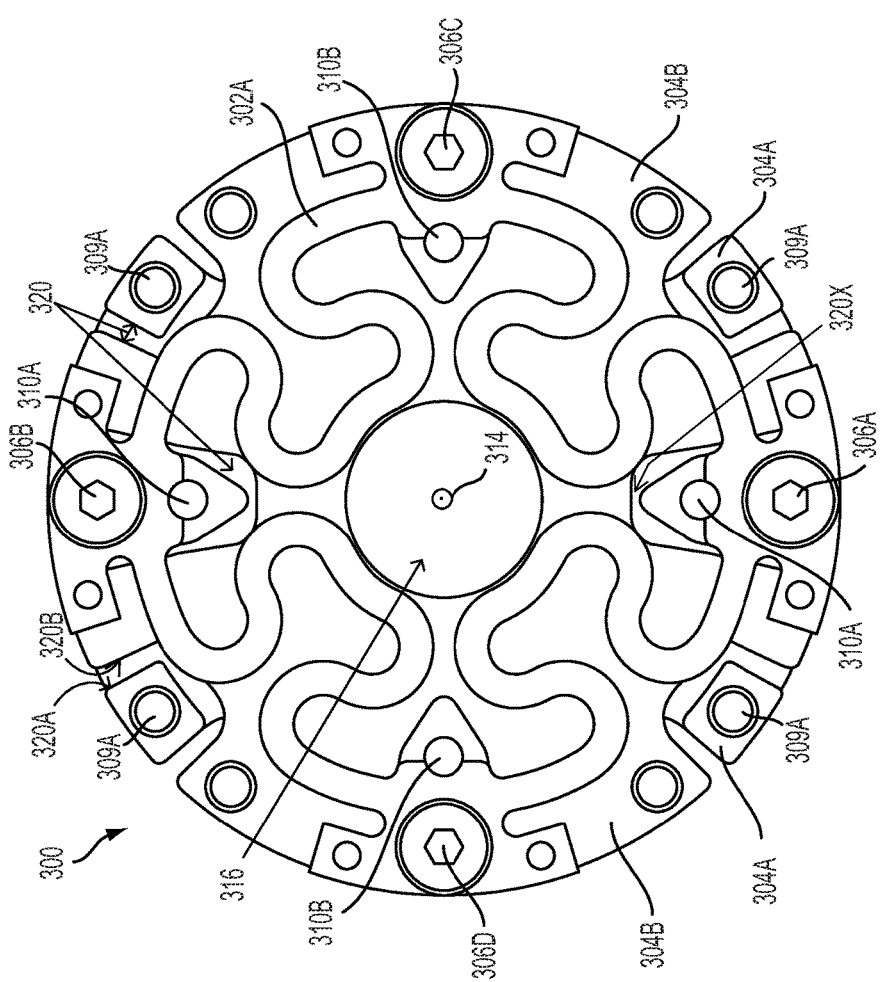

FIG. 3A is an isometric view of a flexure assembly 300 that may be used as a component of a force/torque sensor. FIG. 3B is a top view of the flexure assembly 300. In some embodiments, the flexure assembly 300 may be connected to external components. For example, the flexure assembly 300 may be located within a sensor housing (not shown in FIG. 3A or 3B) as part of a robotic system, such as sensor housing 222 and robotic arm 200 of FIG. 2.

The flexure assembly 300 may include a first flexural element 302A, a second flexural element 302B (together, the flexural elements 302A-B), a first rigid component 304A, and a second rigid component 304B (together, the rigid components 304A-B). Within examples, the flexure assembly 300 may include two opposing flexural elements 302A-B and two complementary rigid components 304A-B. For example, as illustrated in the isometric view of FIG. 3A, the two opposing flexural elements 302A-B may be the two outermost parts of the flexure assembly 300 while the two complementary rigid components 304A-B may be the two inner parts of the flexure assembly. As such, within at least one embodiment depicted in FIG. 3B, from a top view, only one flexural element 302A of the two flexural elements 302A-B may be visible. Other assemblies or organizations of the different parts of the flexure assembly 300 may be possible as well.

The flexure assembly 300 may further include one or more connection points on a first plane 306A-B, one or more other connection points on the first plane 306C-D, one or more connection points on a second plane 308A-B, and one or more other connection points on the second plane 308C-D. The rigid components 304A-B may further include one or more external connection points 309A-B and a plurality of alignment features 310A-B.

In one example, the flexure assembly 300 may be installed into a robotic system, such as robotic arm 200 as shown in FIG. 2, by coupling the first rigid component 304A to a first external component (not shown in FIG. 3A or 3B) using one or more external connection points 309A on one side of the flexure assembly 300 and by coupling the second rigid component 304B to a second external component (not shown in FIG. 3A or 3B) using one or more other external connection points 309B on an opposite side of the flexure assembly 300. Within some examples, the flexure assembly 300 may be a mechanical coupling or a spring between external components coupled to the flexure assembly.

The rigid components 304A-B of the flexure assembly 300 may be configured to deflect, or move relative to each other, in six degrees-of-freedom. As such, each of the rigid components 304A-B, relative to the other rigid component, are able to translate along and also rotate about three perpendicular axes. A load may be applied to at least one of the first or second rigid components 304A-B at external connection points 309A-B which may cause the rigid components 304A-B to deflect. The load may include axial and/or radial components, exposing the flexure assembly 300 to various forces and/or moments. Axial components of the load may cause tension or compression along an axis 314 that may be parallel to a Z-axis, as well as moments about an X-axis or a Y-axis that may both be perpendicular to the Z-axis and also perpendicular to each other. Radial components of the load may cause forces along the X-axis or the Y-axis, as well as moments about the Z-axis. Furthermore, radial components of the load that are offset along the Z-axis may cause moments about the X-axis and/or Y-axis.

Each of the flexural elements 302A-B, coupled to the rigid components 304A-B, may resist the movement between the rigid components 304A-B when a load is applied on the flexure assembly 300. Within examples, each of the flexural elements 302A-B may be considered a flexible support structure that may be coupled to components (such as the rigid components 304A-B) but still allow bending, twisting or other motions between the connected components. In some aspects, the flexural elements 302A-B may be flexure bearings. The flexural elements 302A-B may allow for relative motion between coupled components, but may also act like a spring in tending the coupled components towards a zero applied load resting state. In one example, the flexural elements 302A-B may act like and/or be considered springs. In an example embodiment, the rigid components 304A-B may be coupled to a housing that further includes a system for sensing the deflection of the rigid components 304A-B caused when a load is applied to the flexure assembly 300.

The flexural elements 302A-B may be spaced apart from each other by a fixed height 312 of the rigid components 304A-B along the axis 314. Within examples, the first flexural element 302A may be axially offset from the second flexural element 302B by the fixed height 312. Further, the flexural elements 302A-B may be centered on the axis 314. The first flexural element 302A may be coupled to the first rigid component 304A at one or more connection points on the first plane 306A-B. Furthermore, the first flexural element 302A may be coupled to the second rigid component 304B at one or more other connection points on the first plane 306C-D.

Similarly, the second flexural element 302B may be coupled to the first rigid component 304A at one or more connection points on the second plane 308A-B (connection point 308B is not shown but corresponds to connection point 306B on an opposite side of the first rigid component 304A). The second flexural element 302B may be coupled to the second rigid component 304B at one or more other connection points on the second plane 308C-D (connection point 308D is not shown but corresponds to connection point 306D on an opposite side of the second rigid component 304B).

In at least one embodiment, the one or more connections on the first plane 306A-B and the one or more other connections on the first plane 306C-D may be symmetrically spaced about the axis 314. Further, the one or more connections on the second plane 308A-B and the one or more other connections on the second plane 308C-D may be symmetrically spaced about the axis 314. In some examples, the symmetry of the connection points may result in connection points being equally spaced about the axis 314.

As shown in FIGS. 3A and 3B, the one or more connection points on the first plane 306A-B may alternate with the one or more other connection points on the first plane 306C-D, such that the one connection point 306A is between the other connection points 306C-D, and that the one connection point 306B is also between the other connection points 306C-D. In one embodiment, each of the one or more connection points on the first plane 306A-B may be considered orthogonal (relative the axis 314) to each of the one or more other connection points on the first plane 306C-D. For example, when the one or more connection points on the first plane 306A-B alternate with the one or more other connection points on the first plane 306C-D, the one connection point 306A may be 90 degrees from the other connection point 306C and 90 degrees from the other connection point 306D, and the one connection point 306B may also be 90 degrees from the other connection point 306C and 90 degrees from the other connection point 306D.

As illustrated in FIGS. 3A and 3B, the one or more connection points on the first plane 306A-B may include two connection points orientated 180 degrees from each other, as shown by the one connection point on the first plane 306A orientated 180 degrees about the axis 314 from the one connection point on the first plane 306B. Additionally, the one or more other connection points on the first plane 306C-D may include two connection points orientated 180 degrees from each other, as shown by the one other connection point on the first plane 306C orientated 180 degrees from the one other connection point on the first plane 306D.

In one example, the one or more connection points on the first plane 306A-B and the one or more other connection points on the first plane 306C-D may be located near an outer edge of the flexural assembly 300, or near the outer edges of the rigid components 304A-B. In some embodiments, the one or more connection points on the first plane 306A-B may be near an outer edge of the flexural assembly while the one or more other connection points on the first plane 306C-D may be located near the center of the flexural assembly, for example near the axis 314.

In one embodiment, the one or more connection points on the second plane 308A-B and the one or more other connection points on the second plane 308C-D may be spaced, arranged, and/or located similar to or the same as what has been described for the one or more connection points on the first plane 306A-B and the one or more other connection points on the first plane 306C-D. In other embodiments, the one or more connection points on the second plane 308A-B and the one or more other connection points on the second plane 308C-D may be spaced, arranged, and/or located differently than what has been described for the one or more connection points on the first plane 306A-B and the one or more other connection points on the first plane 306C-D.

Additionally, in some examples, the one or more connection points on the first plane 306A-B may correspond and share one or more respective axes with the one or more connection points on the second plane 308A-B. The one or more shared respective axes may be parallel to the axis 314. For example, as illustrated in FIGS. 3A and 3B, one connection point on the first plane 306A may be considered to correspond and share an axis with the one connection point on the second plane 308A. Similarly, the one or more other connection points on the first plane 306C-D may correspond and may share one or more respective axes with the one or more other connection points on the second plane 308C-D. For example, one other connection point on the first plane 306C may be considered to correspond and share an axis with the one other connection point on the second plane 308C.

As shown in FIGS. 3A and 3B, the first rigid component 304A may be coupled to the first external component using four external connection points 309A. Further, the second rigid component 304B may be coupled to the second external component using four external connection points 309B. In some embodiments, the first external component may be a first housing component and the second external component may be a second housing component of the flexure assembly 300. In such an embodiment, external connection points 309A-B may be considered one or more first housing component connection points 309A and one or more second housing component connection points 309B.

One or more connection points on the first plane 306A-B, one or more other connection points on the first plane 306C-D, one or more connection points on the second plane 308A-B, one or more other connection points on the second plane 308C-D, and one or more external connection points 309A-B may be the points of interface between different components of the flexure assembly 300, such as the flexural elements 302A-B, the rigid components 304A-B, and any external components (such as housing components not shown in FIG. 3A or 3B). The connections between components may include tapped, threaded, or other type of holes or recesses along with corresponding bolts, screws, and or dowels. Other connection means may also be considered when coupling the different components.

As illustrated in FIGS. 3A and 3B, two flexural elements such as the first flexural element 302A and the second element 302B may be configured to keep the rigid components 304A-B at a zero-load rest position and permit the deflection of at least one of the rigid components 304A-B when a load is applied. In other embodiments, more than two flexure elements may be considered. In one embodiment, each of the flexural elements 302A-B may have the same shape and/or dimensions, among other characteristics. In other embodiments, each of the flexural elements 302A-B may have different shapes and dimensions. In one example, flexural elements 302A-B may be made from the same material, such as aluminum or steel. Flexural elements 302A-B may also be made from differing materials depending on a desired modulus of elasticity of the materials.

The elasticity of the material and the design (i.e. shape and dimensions) of the flexural elements 302A-B may give the flexural elements 302A-B particular stiffness coefficients in six degrees-of-freedom within a stiffness matrix. Different materials and/or designs of one or all of the flexural elements 302A-B may be chosen based on a stiffness of just one of the flexural elements 302A-B or a combined stiffness of the flexural elements 302A-B together. As such, within examples of designs of the flexural elements 302A-B, stiffness coefficients in each of six degrees-of-freedom may be specifically tuned based on a desired environment or use for the flexure assembly 300.

As shown in FIGS. 3A and 3B, the two flexural elements 302A-B have a high aspect ratio and are spaced apart along the axis 314 by the fixed height 312. The simple profile with the fixed height 312 (or cross section) of flexural elements 302A-B may allow the flexural elements 302A-B to be manufactured from a variety of low-cost manufacturing methods such as CNC machining, laser cutting, stamping, extrusion, and wire-edm, among other possibilities. Furthermore, the variety of manufacturing methods may allow for easy creation of a variety of flexural element shapes and dimensions that then may have a range of stiffness. In addition, spacing the two flexural elements 302A-B may allow the flexure assembly 300 to better respond to a bending moment about an axis perpendicular to the axis 314 without requiring a larger diameter of the flexural elements 302A-B. In other words, for example, spacing the flexural elements 302A-B by the fixed height 312 may allow the flexure assembly 300 to be tuned to a higher stiffness in response to an axial load. In some examples, the flexure assembly 300 with two high aspect ratio flexural elements 302A-B spaced by a fixed height 312 may have a small diameter and fit within smaller robotic systems while maintaining a high moment capacity compared to an assembly with a different flexural element design, such as a single flexural element.

In some embodiments, the rigid components 304A-B may be considered internal spring mounts. The rigid components 304A-B may have the same shape and dimensions and may be manufactured from the same material, such as aluminum or steel. Within examples, the rigid components 304A-B may be constructed from a material such that the rigid components 304A-B may be designed not to bend or flex (or minimize any inherent flexibility). Further, the rigid components 304A-B may have simple geometries capable of being created with low-cost, high volume manufacturing processes such as casting. For example, the rigid components 304A-B may be considered cylindrical in shape such that an outer edge, i.e. an edge farthest from axis 314, may be generally circular.

Within examples, the rigid components 304A-B may include features that require tight tolerances and may be designed such that all critical X-Y planar features can be machined in a single machining set-up, possibly reducing tolerance stack-up in the assembly. For some examples of rigid components 304A-B, a second machining setup may be required to machine features in the Z dimension. Within other examples, critical X-Y planar features may be machined with two separate set-ups. In one example, the rigid components 304A-B may have a shape and dimensions such that surfaces of the first rigid component 304A do not interfere with surfaces of the second rigid component 304B when the rigid components 304A-B deflect when a load below a maximum design load is applied.

A maximum design load may be considered the minimum load that causes at least one surface of the first rigid component 304A to engage at least one surface of the second rigid component 304B. In one example, an overload rating or capacity of the flexure assembly 300 may be ten times the design load and the maximum design load may be four times the design load (or two fifths the overload capacity). In another example, the maximum design load may be ten times a design load.

In some examples, the geometry(ies) of the rigid components 304A-B may define at least one hard stop, such as axial hard stop 318 and/or radial hard stop 320. A hard stop may be integrated into components of the flexure assembly 300 because the complementary shape and dimensions of the components allows surfaces of the components to correspond by facing each other and further allows those surfaces to engage each other when a load greater than the design load is applied to the flexure assembly 300.

For example, the at least one axial hard stop 318 may include at least one surface of the first rigid component 318A and at least one corresponding surface of the second rigid component 318B. As shown in FIG. 3A, the at least one axial hard stop 318 may be configured to prevent at least one of the first flexural element 302A and the second flexural element 302B from yielding, fatigue, fracturing, or otherwise being damaged by engaging the at least one surface of the first rigid component 318A with the at least one corresponding surface of the second rigid component 318B when an axial load greater than a maximum design axial load is applied to the device.

The axial load may be a component of the applied load that acts parallel to the direction of the axis 314. In some aspects then, the axial load may include tensile and or compressive forces along a Z-axis that is parallel to the axis 314. Furthermore, the axial load may include moments about an X-axis or a Y-axis, both which may be perpendicular to the Z-axis as well as being perpendicular to each other. As such, the axial load may be at least one component of a load that causes a moment about the X-axis, a moment about the Y-axis, tension along the Z-axis, or compression along the Z-axis. Furthermore, the at least one axial hard stop 318 may then include at least one surface from one component and one corresponding surface from another component that may move relative to each other when the axial load is applied to the flexure assembly 300.

Additionally, the geometry(ies) of the rigid components 304A-B may define at least one radial hard stop 320. Radial hard stop 320 may include at least one surface of the first rigid component 320A and at least one corresponding surface of the second rigid component 320B. As shown in FIG. 3A, the at least one radial hard stop 320 may be configured to prevent at least one of the first flexural element 302A and the second flexural element 302B from fatigue, yielding, fracturing, or otherwise being damaged by engaging the at least one surface of the first rigid component 320A with the at least one corresponding surface of the second rigid component 320B when a radial load greater than a maximum design radial load is applied to the device.

The radial load may be a component of the applied load that acts perpendicular to the direction of the axis 314. In some aspects then, the radial load may include moments about the Z-axis as well as components of forces that act along or parallel to the X-axis and/or Y-axis. In some instances, the radial load includes components of a load that act within or parallel to a plane defined by the X-axis and Y-axis. As such, the radial load may be at least one component of a load that causes a moment about the Z-axis, a moment about the X-axis, a moment about the Y-Axis, tension or compression along the X-axis, or tension or compression along the Y-axis. Furthermore, the at least one radial hard stop 320 may then include at least one surface from one component and one corresponding surface from another component that may move relative to each other when the radial load is applied to the flexure assembly 300.

For example, radial hard stop 320X may be defined by one surface of the first rigid component 304A and another corresponding surface of the second rigid component 304B where both surfaces may be arranged along the X-axis. If a radial load greater than the maximum design radial load is applied along the X-axis, the one surface of the first rigid component 304A may engage the corresponding surface of the second rigid component 304B. In yet another example, radial hard stop 320Z may include corresponding surfaces of rigid components 304A-B and may be configured to prevent fracture from a moment about the Z-axis (in other words a rotation about the axis 314) that may be at least a component of the radial load.

As such, in at least one example, the at least one axial hard stop 318 and the at least one radial hard stop 320 may be defined by corresponding surfaces of the rigid components 304A-B. In some embodiments, the rigid components 304A-B may each have the same geometry, i.e. the same shape and dimensions, and further the rigid components 304A-B may interlace with one another such that corresponding surfaces of each of the rigid components 304A-B are opposed to one another in manner that then defines at least one axial hard stop 318 and the at least one radial hard stop 320. Within examples, hard stops such as the at least one axial hard stop 318 and the at least one radial hard stop 320 may provide alternate load path(s) to the flexural elements 302A-B when the applied load is greater than the maximum design load.

In some instances, the spacing between the corresponding surfaces that make up a hard stop may be based on the unique stiffness characteristic along each axis. As such, an appropriately spaced hard stop may allow for relative motion between rigid components 304A-B without setting a single motion limit for all potential displacements of the flexure assembly 300 in six degrees-of-freedom. In other words, each of the hard stops may be considered independently tuned based on a desired motion limit along the axis that the specific hard stop is configured.

In other embodiments, the rigid components 304A-B may not have the same geometry, but still may interlace. The interlacing arrangement of the rigid components 304A-B may cause the rigid components 304A-B to be captive or maintain positive retention between the rigid components 304A-B, even in the absence of springs (or for example the flexural elements 302A-B). In other words, in at least one example, if the flexural assembly 300 is installed as part of a robotic system and the flexural elements 302A-B failed by fatigue, fracture or otherwise becoming damaged, the interlacing arrangement of the rigid components 304A-B may prevent the flexural assembly 300 from becoming completely disjointed or separated.

For example, if either of the flexural elements 302A-B fractured, the at least one axial hard stop 318 and the at least one radial hard stop 320 may prevent the rigid components 304A-B from separating from one another. The rigid components may not separate from one another because the at least one surface of the first rigid component 318A and at least one corresponding surface of the second rigid component 318B, and the at least one surface of the first rigid component 320A and at least one corresponding surface of the second rigid component 320B may engage, or come into contact, and limit any axial and/or radial movement of the rigid components 304A-B with respect to one another. The at least one axial hard stop 318 and at least one radial hard stop 320 may be considered to be self-contained because each of the axial hard stops 318 and radial hard stops 320 include surfaces from two different components, such as the rigid components 304A-B in some examples.

Within examples, flexure assembly 300 may include other hard stops that may be integrated into different components of the flexure assembly 300. For example, mounting surfaces of housing components may act as one or more hard stops. A hard stop may include one surface of a rigid component, such as a surface of the rigid components 304A-B, and one surface of a housing component (not shown in FIGS. 3A and 3B). In other embodiments, depending on the direction and/or magnitude of a load applied to the flexure assembly 300, a surface of the first rigid component 304A may engage either a surface of the second rigid component 304B or a surface of a housing component.

As illustrated in FIGS. 3A and 3B, the rigid components 304A-B may include a plurality of alignment features 310. Within examples, the plurality of alignment features 310 may engage the flexural components 302A-B. In one example embodiment, the first rigid component 304A may include two alignment features 310A, each of which may be pressed fully through the first rigid component 304A such that the alignment features 310A may extend axially beyond the fixed height 312. Similarly, the second rigid component 304B may include two alignment features 310B that may extend axially beyond the fixed height 312. The plurality of alignment features 310A may be rigidly coupled to the rigid component 304A while the plurality of alignment features 310B may be rigidly coupled to the rigid component 304B. Within at least one embodiment, as shown in FIGS. 3A and 3B, the plurality of alignment features 310 may be alignment pins. Within other embodiments, the plurality of alignment features 310 may include raised bosses or other axially defined features that may be configured to engage the flexural elements 302A-B.

In one example, the first flexural element 302A may interface with the two alignment features 310A positioned in the first direction and connected to the first rigid component 304A while also interfacing with the two alignment features 310B in the first direction and connected to the second rigid component 304B. Similarly, the second flexural element 302B may interface with two alignment features 310A positioned in the second direction and connected to the first rigid component 304A while also interfacing with the two alignment features 310B positioned in the second direction and connected to the second rigid component 304B. As illustrated in FIGS. 3A and 3B, the alignment features 310A-B may maintain the flexural elements 302A-B radial position relative to the axis 314 and/or the rigid components 304A-B.

The alignment features 310A-B may be positioned for self-fixturing, or self-aligning, of the flexural elements 302A-B and/or the rigid components 304A-B when there is no load applied to the flexural assembly 300. For example, the flexural elements 302A-B and the rigid components 304A-B may begin in a designed zero-load rest position. When a load is applied on the flexural assembly 300, the flexural elements 302A-B may bend and/or deform and the rigid components 304A-B may deflect, and once the load is removed from the flexural assembly 300, the rigid components 304A-B and the flexural elements 302A-B may return to the zero-load rest position. The alignment features 310A-B may be configured to assist the flexural elements 302A-B and the rigid components 304A-B return to the designed zero-load position by helping maintain a radial position of the flexural elements 302A-B in relation to the rigid components 304A-B. In one example, the alignment features 310A-B may prevent the flexural elements 302A-B from translating perpendicularly inward towards the axis 314.

In some examples, the shape and dimensions of the flexural elements 302A-B and the rigid components 304A-B may also include a cavity 316. The cavity 316 may be located in the center of the flexural assembly 300, around the axis 314. In some examples, the cavity 316 may be designed to house or provide access for electrical components such as wiring or other internal components. Housing electrical components within the cavity 316 may limit the exposure of such components to the environment surrounding a robotic system in which the flexure assembly 300 may be installed.

Figure 4:
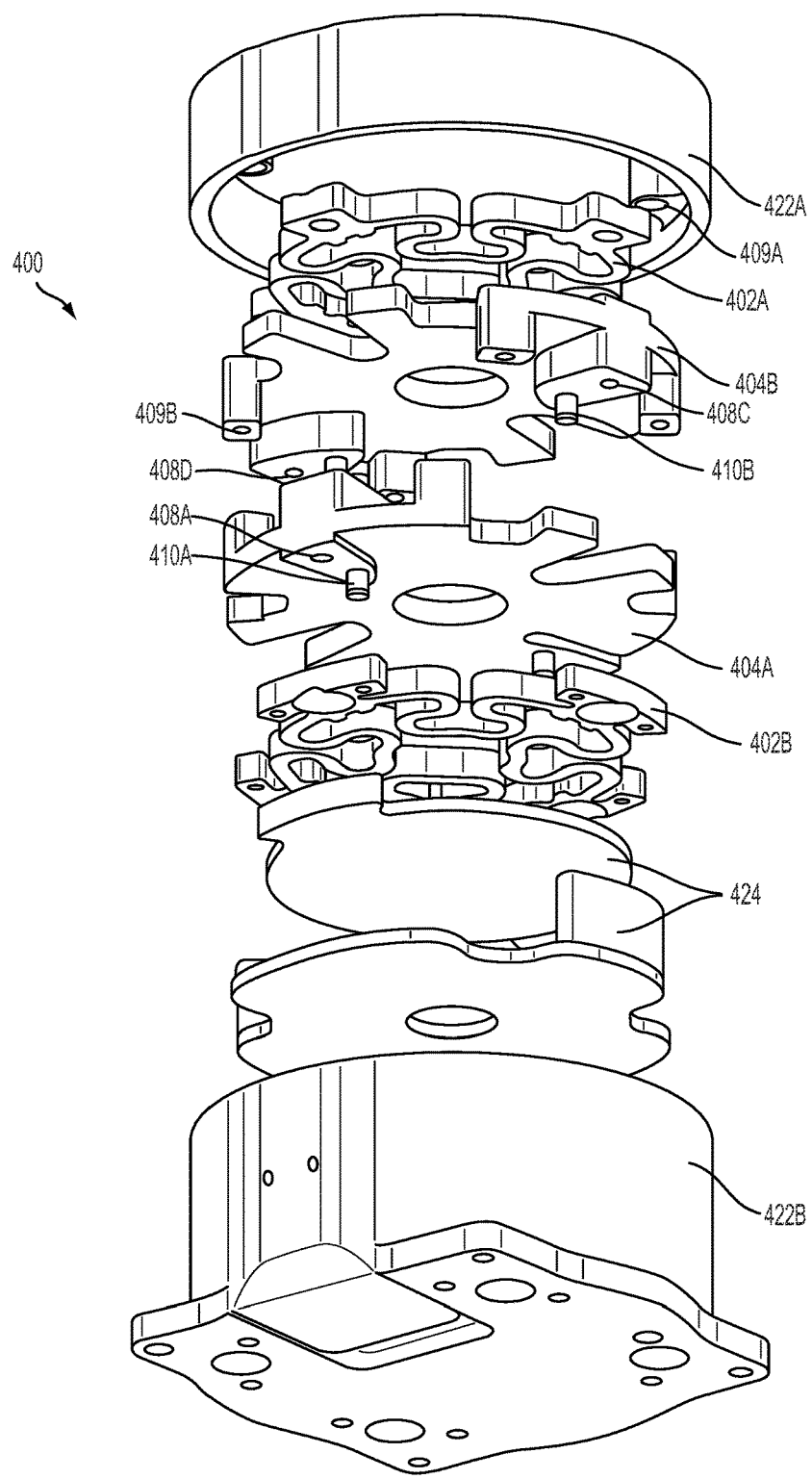
FIG. 4 illustrates an example flexure assembly with sensors and housing components, according to an example embodiment.

FIG. 4 illustrates an exploded isometric view of a flexure assembly 400. The flexure assembly 400 may be similar to the flexure assembly 300 and include similar components as those illustrated in FIGS. 3A and 3B. For example, the flexural elements 302A-B may be the same or similar to the flexural elements 302A-B of FIGS. 3A and 3B, the rigid components 404A-B may be the same or similar to the rigid components 304A-B, and so on. Further, the housing components 422A-B may be similar to the sensor housing 222 of FIG. 2.

As shown in FIG. 4, the flexure assembly 400 may provide an additional perspective as to how the flexure assembly 400's different parts join and/or relate. The flexure assembly 400 may include a first flexural element 402A, a second flexural element 402B (together, the flexural elements 402A-B), a first rigid component 404A and a second rigid component 404B (together, the rigid components 404A-B). Flexure assembly 400 may further include a first housing component 422A, a second housing component 422B (together, the housing components 422A-B), and a sensor assembly 424. The flexure assembly 400 may also include one or more connection points on a second plane 408A (similar to one or more connection points on a second plane 308A hidden from view in FIGS. 3A and 3B), one or more other connection points on the second plane 408C-D (similar to one or more other connection points on a second plane 308C-D hidden from view in FIGS. 3A and 3B), one or more external connection points 409A-B, and a plurality of alignment features 410A-B.

As illustrated in FIG. 4, the plurality of alignment features 410A may be rigidly coupled to the first rigid component 404A and may further be similar to the alignment features 310A. Also, the plurality of alignment features 410B may be rigidly coupled to the second rigid component 404B and may further be similar to the alignment features 310B.

Furthermore, as illustrated in FIG. 4, the one or more external connection points 409A-B may be the point(s) of interface between the rigid components 404A-B and the housing components 422A-B. For example, one or more external connection points 409A may describe the location of the interface between the first rigid component 404A and the first housing component 422A. Also, one or more external connection points 409B may describe the location of the interface between the second rigid component 404B and the second housing component 422B. In some embodiments, the rigid components 404A-B may be coupled to the housing components 422A-B at the one or more external connection points 409A-B. In at least one example, a load applied on one or both of the housing components 422A-B may be transferred to the rigid components 404A-B at the one or more external connection points 409A-B.

The housing components 422A-B may couple directly to the rigid components 404A-B. Within a robotic system, such as robotic system 200 of FIG. 2, the housing components may connect to other components of the robotic system. For example, in one embodiment, the first housing component 422A may be coupled to a joint, such as joint 204C, and the second housing component 422B may be coupled to an end effector, such as end effector 208 in FIG. 2. In such an embodiment wherein the housing components 422A-B are coupled to other components of a robotic system, a force(s) or load(s) applied on the robotic system may be transferred to the housing components 422A-B which may then be coupled to the rigid components 404A-B. In some embodiments, the flexural elements 402A-B, the rigid components 404A-B, and the sensor assembly 424, among other possible components may fit inside the housing components 422A-B.

The sensor assembly 424 may include one or more parts that may be configured to measure the deflection of the rigid components 404A-B when a load may be applied to at least one of the rigid components 404A-B by way of at least one of the housing components 422A-B. The deflection may include the relative displacement and rotation of one of the rigid components 404A-B relative to another of the rigid components 404A-B. The sensor assembly 424 may utilize any number of sensing techniques or sensing elements in order to determine the deflection of the rigid components 404A-B. In one example, the sensor assembly 424 may be coupled directly to at least one of the flexural elements 402A-B and/or the rigid components 404A-B. In an embodiment where the sensor assembly may be coupled to at least one of the flexural elements 402A-B and/or the rigid components 404A-B the sensor assembly 424, the housing components 424 may be independent of the sensor assembly 424 such that the housing components 422 do not interfere with the sensor assembly 424. In one embodiment, the sensor assembly 424 may be coupled just to one of the flexural elements such as the second flexural element 402B.

Figure 5B:
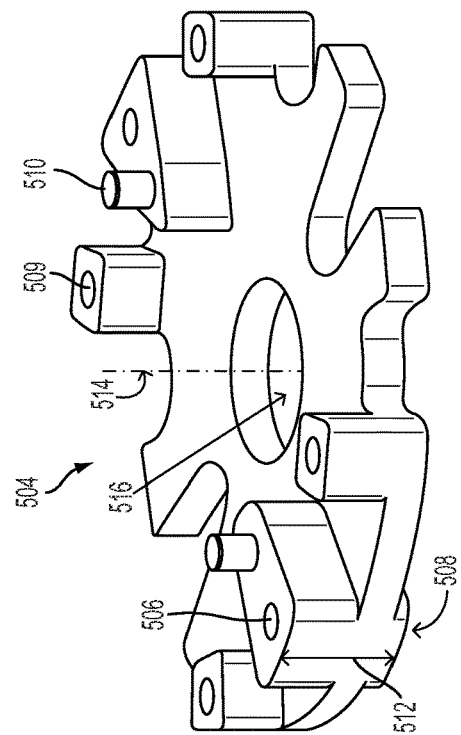
FIGS. 5A and 5B illustrate the separate parts of the flexure assembly, according to an example embodiment.
Figure 5A:
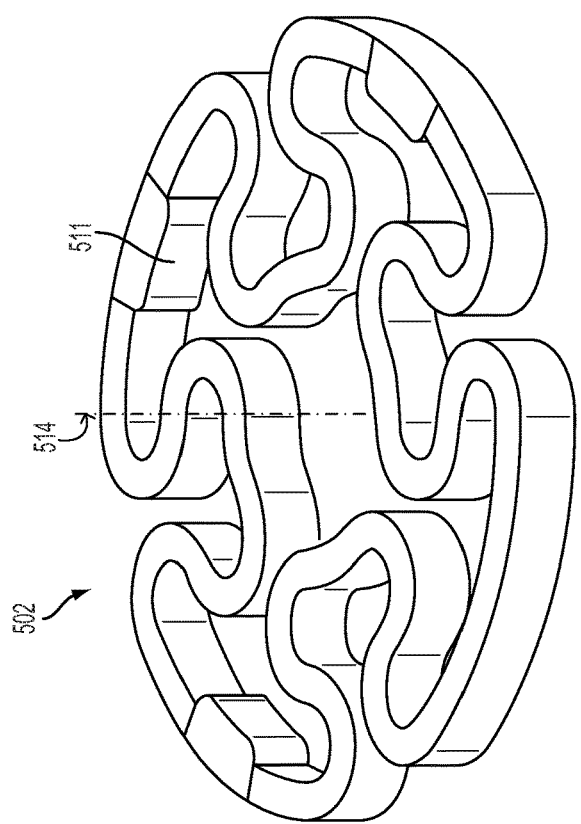

FIG. 5A further illustrates a design for a single flexural element 502 that may be similar or the same as the flexural elements 302A-B in FIGS. 3A and 3B or as the flexural elements 402A-B in FIG. 4. The flexural element 502 may include a plurality of alignment interface points 511. The alignment interface points 511 may include a groove or slot that is configured to mesh with alignment pins in order to maintain a radial position of the flexural element 502 relative to the axis 514.

FIG. 5B further illustrates a geometry and possible features of a single rigid component 504. The rigid component 504 may be similar or the same as the rigid components 304A-B in FIGS. 3A and 3B or as the rigid components 404A-B in FIG. 4. FIG. 5B may further include one or more connection points on a first plane 506, one or more connection points on a second plane 508, one or more external connection points 509, a plurality of alignment pins 510, a fixed height 512, an axis 514, and a cavity 516. The components of FIG. 5B may be the same or similar to the components in FIGS. 3A, 3B, and 4. Within a flexure assembly, at least two rigid components similar to rigid component 504 may be interlaced together. For example, the rigid components 304A-B in FIG. 3A may include a first rigid component shaped like rigid component 504 and positioned in a first direction, and also may include a second rigid component shaped like rigid component 504 positioned inversely to the first rigid component in the first position such that extrusions of the first rigid component fit within crevices or cut-outs of the second rigid component, and visa-versa.

As illustrated in FIG. 5B, the one or more connection points on the first plane 506 and the one or more connection points on the second plane may be spaced by the fixed height 512 of the rigid component 504. For example, in an embodiment wherein a first flexural element, such as flexural element 502, is coupled at the one or more connection points on the first plane 506 and a second flexural element, possibly also like the flexural element 502, is coupled at the one or more connection points on the second plane 508, the first flexural element 502 may be considered to be spaced apart from the second flexural element 502 by the fixed height 512 of the rigid component 504.

FIG. 5B further illustrates the plurality of alignment pins 510. The plurality of alignment pins 510 may be the same or similar to the alignment features 310 of FIGS. 3A and 3B. Further, the plurality of alignment pins 510 may correspond and interface with the alignment interface points 511 of the flexural element 502 of FIG. 5A in order to maintain a radial position of the flexural element 502 relative to the axis 514. For example, the alignment pins 510 may allow the flexural element 502 to move axially parallel to the axis 514, and may allow the flexural element 502 to flex and/or bend about the axis 514, but the alignment pins 510 may help prevent outer portions of the flexural element 502 from translating perpendicularly to the axis 514.

In one embodiment, the rigid component 504 may include two alignment pins 510 that may be parallel or nearly parallel to the axis 514. In one embodiment, the two alignment pins may be spaced 180 degrees apart from each other on opposite sides of the axis 514, and also be equidistant from the axis 514. Similarly, the flexural assembly 502 may include four alignment interface points 511 (shown in FIG. 5A) that may be spaced out in 90 degree increments about the axis 514 and further, may be equidistant from the axis 514. Thus, in one assembled example, the alignment pins 510 of the rigid component 504 may be a distance from the axis 514 such that an outer edge of the alignment pins 510 interfaces with corresponding alignment interface points 511 of the flexural element 502 shown in FIG. 5A.

Figure 6:
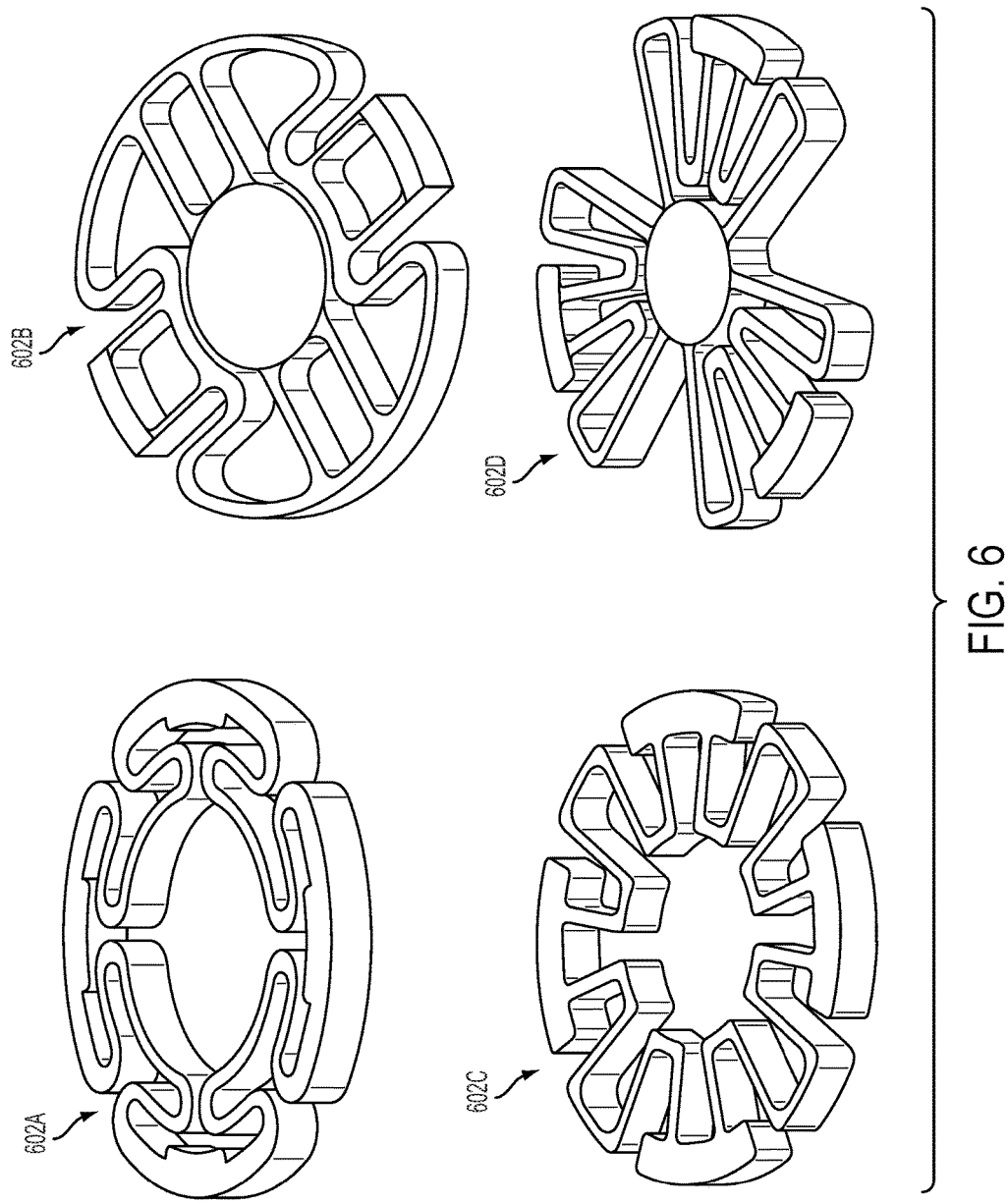
FIG. 6 illustrates other examples of flexure element designs, according to example embodiments.

FIG. 6 illustrates potential flexural elements 602A-D. Flexural elements 602A-D may include similar components as the flexural elements 302A-B, the flexural elements 402A-B, and the flexural element 502 in FIGS. 3A, 3B, 4, and 5A respectively. Each of the flexural elements 602A-D include a different design and each of the flexural elements 602A-D may then also exhibit different stiffness characteristics in response to individual component loads. In some examples, the two flexural elements 302A-B of FIG. 3A may be replaced by two of the flexural elements 602A-D, and then as a result the flexure assembly 300 may have a different overall stiffness that depends on the flexural element design chosen. In another example, first flexural element 302A of FIG. 3A may be replaced by any one of the flexural elements 602A-D, while second flexural element 302B may be replaced by any one of the other flexural element designs 602A-D not chosen for the first flexural element 302A. In an example that includes two flexural elements, such as flexural elements 302A-B, one flexural element may have one stiffness while the other flexural element has a different stiffness based on the expected direction and magnitude of forces that may be exerted on the flexure assembly.

Within examples, flexural elements of different designs (such as flexural element designs 602A-D) and stiffnesses may be coupled to rigid components (such as rigid components 304A-B) in order to tune and/or control the deflection of the rigid components. Controlling the relative movement of the rigid components may allow a sensor, such as sensor assembly 424, to determine the displacement and/or rotation between the rigid components with more precision and accuracy. The tuning and/or control may be based on an expected force or load that may be experienced by the robotic system. For example, if the robotic system was known to experience a significantly higher load in one direction compared to another, the flexural elements may be designed with different stiffnesses in mind in order to tune the movement of the rigid components within the flexure assembly so deflection is not dominated by any single component load.

In another example, a less stiff flexural element design may be more desirable to measure smaller forces or loads because if the flexural element design is too stiff, the smaller forces may not cause a sufficient deflection of the rigid components that may be measured by a sensor. And if the rigid components do not deflect a sensor will be unable to record any change in displacement. In another opposite example, a flexure assembly with the capacity to measure greater loads may be more desirable and thus the flexural element designs with a greater stiffness may allow for more accuracy. In an example where the flexural elements may be too flexible, an applied load may cause at least one surface of one rigid component to engage at least one surface of another rigid component (e.g. engaging the at least one of the hard stops referenced in FIGS. 3A and 3B, i.e. the plurality of axial hard stops 318 and/or the plurality of radial hard stops 320) and thus the actual applied load may not be possible to measure.

Figure 7B:
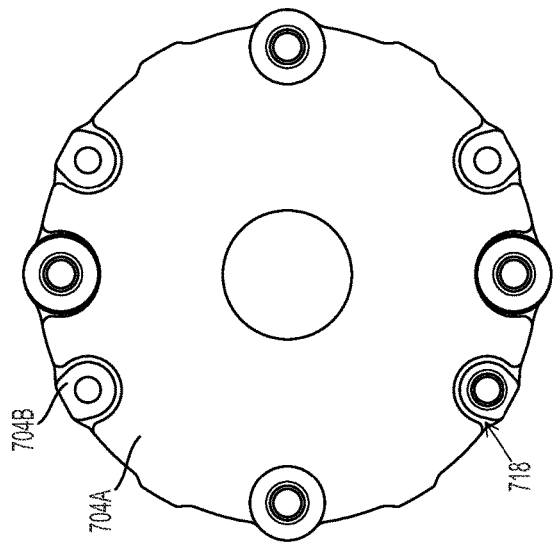
FIGS. 7A, 7B and 7C illustrate components of another example flexure assembly, according to an example embodiment.
Figure 7C:
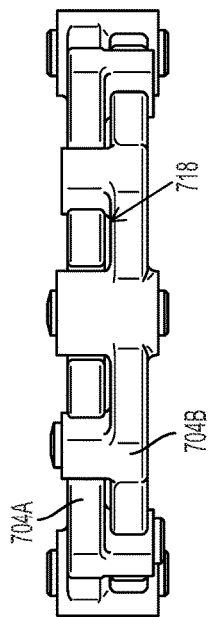
Figure 7A:
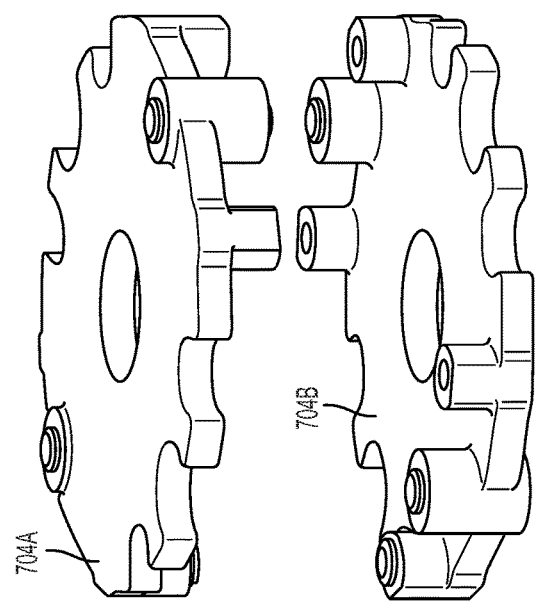

FIGS. 7A, 7B and 7C illustrate another embodiment of rigid components 704A-B of a flexure assembly. Rigid components 704A-B may include similar components as the rigid components 304A-B, the rigid components 404A-B, and the rigid component 504 in FIGS. 3A, 3B, 4, and 5B respectively. The first rigid component 704A may have the same shape and dimensions as the second rigid component 704B. The first rigid component 704A and the second rigid component 704B may interlace with one another and may form at least one integrated hard stop 718. The integrated hard stop(s) 718 may include one surface from the first rigid component 804A and a corresponding surface of the second rigid component 704B. The one surface from the first rigid component 704A and the corresponding surface of the second rigid component 704B may oppose each other and be configured to prevent at least one of a first flexural element and a second flexural element from fatigue or fracture by engaging the at least one surface of the first rigid component 704A with the at least one corresponding surface of the second rigid component 704B when an applied load greater than a maximum design load is applied to the flexure assembly. The rigid components 704A-B may also include alignment bosses that may be similar to the alignment features 310 of FIGS. 3A and 3B.

Figure 8:
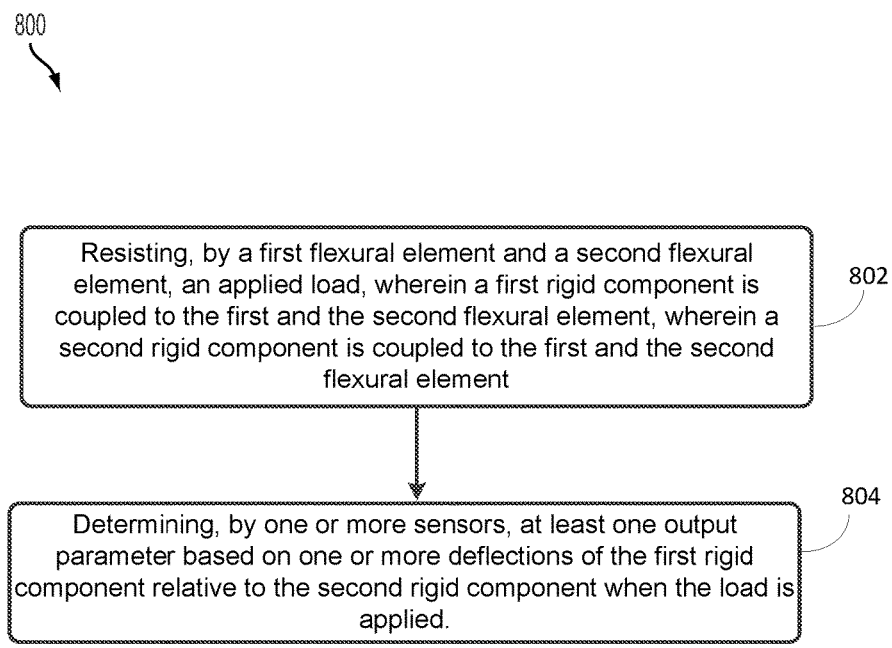
FIG. 8 is a block diagram of an example method, according to an example embodiment.

FIG. 8 is a flowchart of an example method for determining at least one output parameter based on deflections of rigid components of a flexure assembly when a load is applied to the flexure assembly in accordance with at least some embodiments described herein. In one example implementation, method 800 describes resisting an applied load and determining an output parameter based on one or more deflections of rigid components when the load is applied.

Illustrative methods, such as method 800, may be carried out in whole or in part by a component(s) in a robotic system, such as one or more of the components in the robotic system 100 illustrated in FIG. 1, or by a component(s) in robotic arm 200 as illustrated in FIG. 2. It should be understood that example methods, such as method 800, might be carried out by entities, or combinations of entities (i.e., by other computing devices, robotic devices, and/or combinations thereof), without departing from the scope of the invention.

For example, functions of the method 800 may be fully performed by a computing device (or components of a computing device such as one or more processors or controllers), or may be distributed across multiple components of the computing device, across multiple computing devices, and/or across a server. In some examples, the computing device may receive information from sensors of the computing device, or may receive information from other computing devices that collect the information. As with other examples, a computing device, a server, or a robotic system may perform the method 800.

As shown by block 802, the method 800 includes a first and a second flexural element resisting an applied load. The first and second flexural elements may be similar to other examples of flexural elements described within this application, such as flexural elements 302A-B, 402A-B, 502, and/or 602A-D. Block 802 further describes a first rigid component that is coupled to the first and the second flexural elements and a second rigid component that is also coupled to the first and the second flexural element. The rigid components may be similar to other examples of rigid components described within this application, such as rigid components 304A-B, 404A-B, 504, and/or 704A-B. In one example, the load may be applied directly to at least one of the rigid components. Within examples, the rigid components may also include at least one axial hard stop and one radial hard stop, similar to the axial hard stop 318 and radial hard stop 320 of FIG. 3. Further, the first and second flexural elements may have the same shape and dimensions and also the first and second rigid components of method 800 may have the same shape and dimensions.

As shown by block 804, the method 800 further includes determining, by at least one sensor, one or more output parameters based on one or more deflections of the first rigid component and the second rigid component resulting from the applied load. One or more output parameters based on one or more deflections may include at least one force component of an applied load. Additionally, the one or more output parameters may include a position or orientation of an end effector or appendage of a robotic system.

Within examples, the at least one sensor may measure one or more deflections of the first rigid component relative to the second rigid component when a load is applied. The at least one sensor may then determine at least one force component of the applied load based on the measured deflections. Within other examples, the at least one sensor may determine at least one force component of the applied load based on raw signals transmitted from sensing elements of the at least one sensor. The raw signals transmitted from sensing elements of the at least one sensor may be dependent on the deflection(s) between the first and the second rigid components.

Determining one or more output parameters may include transmitting raw output signals, such as voltage or frequency, from sensing elements of the at least one output sensor to a computing device. The computing device may be within the at least one sensor, or may be somewhere else within a robotic system, such as the robotic system 100 in FIG. 1. The computing device may then determine at least one force component of the applied load, or may determine the orientation of the end effector of a robotic arm, such as end effector 208 of FIG. 2, based on the raw signals from the sensing elements.

Further, the deflections caused by the load applied to the flexure assembly may further include the displacement (e.g. translational movement of one rigid component relative to the other rigid component) and/or rotation of the rigid components of the flexure assembly. In some embodiments, the sensor may be similar to the sensor assembly 424 of FIG. 4. Within examples, the one or more sensors may receive sensor data indicating one or more deflections at least one of the first rigid component and the second rigid component resulting from an applied load.

The method 800 may further include determining at least one component of the forces and moments of the applied load based on the one or more deflections measured. In one example, the determining of at least one component of the forces and moments may be further based on the stiffness of the first and second flexural elements. In one aspect, the forces and moments may include at least axial and/or radial forces and moments. In one embodiment, the method 800 may further include altering the operation of at least one of an end effector or a robot arm, based on at least one component of the determined the forces and moments.

Altering the operation of at least one of the end effector or the robot arm may include adjusting an orientation of at least one of the end effector or the robot arm. In other examples, altering the operation of at least one of the end effector or the robot arm may include shutting the robot system off, holding the robot in a static position, or putting the robotic system into a safety mode when a high force is detected. In yet other examples, current applied to actuators or motors of the robotic system (such as actuator(s) 114 of FIG. 1) may be adjusted to reduce the forces applied to the flexure assembly. The end effector may be similar to end effector 208 of FIG. 2, and may be coupled to a first housing component such as housing component 422B of FIG. 4. Further, the robot arm may be coupled to a second housing component, such as housing component 422A of FIG. 4.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

IV. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A device, comprising:
    a first flexural element centered on an axis;
    a first rigid component having a fixed height, wherein the first rigid component and the first flexural element are coupled together at one or more connection points on a first plane, wherein the first plane is perpendicular to the axis;
    a second rigid component having the fixed height, wherein the second rigid component and the first flexural element are coupled together at one or more other connection points on the first plane; and
    a second flexural element centered on the axis, wherein the second flexural element and the first rigid component are coupled together at one or more connection points on a second plane that is parallel to the first plane, wherein the second flexural element and the second rigid component are coupled together at one or more other connection points on the second plane, wherein the second flexural element is axially offset from the first flexural element by the fixed height of the first and second rigid components, and further wherein the first flexural element and the second flexural element resist movement of the first rigid component relative to the second rigid component in at least one degree of freedom.

2. The device of claim 1, further comprising:
    one or more sensors, wherein the one or more sensors are configured to determine at least one component of a load applied on the device based on one or more deflections of the first rigid component relative to the second rigid component when the load is applied.

3. The device of claim 1, further comprising at least one hard stop that comprises at least one surface of the first rigid component and at least one corresponding surface of the second rigid component, wherein the at least one hard stop is configured to prevent at least one of the first flexural element and the second flexural element from yielding by engaging the at least one surface of the first rigid component with the at least one corresponding surface of the second rigid component when a load applied on the device is greater than a maximum design load.

4. The device of claim 1, further comprising at least one axial hard stop that comprises at least one surface of the first rigid component and at least one corresponding surface of the second rigid component, wherein the at least one axial hard stop is configured to prevent at least one of the first flexural element and the second flexural element from yielding by engaging the at least one surface of the first rigid component with the at least one corresponding surface of the second rigid component when an axial load greater than a maximum design axial load is applied to the device.

5. The device of claim 1, further comprising at least one radial hard stop that comprises at least one surface of the first rigid component and at least one corresponding surface of the second rigid component, wherein the at least one radial hard stop is configured to prevent at least one of the first flexural element and the second flexural element from yielding by engaging the at least one surface of the first rigid component with the at least one corresponding surface of the second rigid component when a radial load greater than a maximum design radial load is applied to the device.

6. The device of claim 1, wherein the one or more connection points and the one or more other connection points are symmetrically spaced about the axis, and wherein the one or more connection points and the one or more other connection points on the second plane are symmetrically spaced about the axis.

7. The device of claim 1, wherein the one or more connection points on the first plane correspond to and share one or more respective axes with the one or more connection points on the second plane, and wherein the one or more other connection points on the first plane correspond to and share one or more respective axes with the one or more other connection points on the second plane.

8. The device of claim 7, further comprising a cavity along the axis to house electrical components.

9. The device of claim 1, wherein the one or more connection points on the first plane comprise two connection points orientated 180 degrees from each other, and wherein the one or more other connection points on the first plane comprise two connection points orientated 180 degrees from each other.

10. The device of claim 1, further comprising:
    a first housing component coupled to the first rigid component; and
    a second housing component coupled to the second rigid component.

11. The device of claim 1, further comprising a plurality of alignment features configured for self-fixturing of the first flexural element, the first rigid component, the second rigid component and the second flexural element when no load is applied to the device.

12. The device of claim 1, wherein the first flexural element and the second flexural element have the same shape and dimensions.

13. The device of claim 1, wherein the first rigid component and the second rigid component have the same shape and dimensions.

14. A method, comprising:
    resisting, by a first flexural element and a second flexural element, an applied load, wherein a first rigid component and the first flexural element are coupled together at one or more connection points on a first plane, wherein the first rigid component and the second flexural element are coupled together at one or more connection points on a second plane, wherein a second rigid component and the first flexural element are coupled together at one or more other connection points on the first plane, and wherein the second rigid component and the second flexural element are coupled together at one or more other connection points on the second plane, wherein the first rigid component and the second rigid component have a fixed height, and wherein the first flexural element and the second flexural element are spaced by the fixed height; and determining, by at least one sensor, one or more output parameters based on one or more deflections of the first rigid component relative to the second rigid component when the load is applied.

15. The method of claim 14, wherein the one or more output parameters includes at least one force component of the applied load.

16. The method of claim 15, further comprising:
measuring, by the at least one sensor, one or more deflections between the first rigid component and the second rigid component resulting from the applied load.

17. The method of claim 14, wherein the one or more output parameter includes a position of an end effector, wherein the end effector is coupled to the first rigid component.

18. The method of claim 14, further comprising:
engaging at least one hard stop when the applied load is greater than a maximum design load, wherein the at least one hard stop comprises at least one surface of the first rigid component and at least one corresponding surface of the second rigid component, wherein engaging the at least one hard stop comprises preventing at least one of the first flexural element and the second flexural element from yielding by causing the at least one surface of the first rigid component to come into contact with the corresponding surface of the second rigid component.

19. A robotic system comprising:
a first flexural element centered on an axis;
a first rigid component having a fixed height, wherein the first rigid component and the first flexural element are coupled together at one or more connection points on a first plane, wherein the first plane is perpendicular to the axis;
a second rigid component having the fixed height, wherein the second rigid component and the first flexural element are coupled together at one or more other connection points on the first plane;

a second flexural element centered on the axis, wherein the second flexural element and the first rigid component are coupled together at one or more connection points on a second plane that is parallel to the first plane, wherein the second flexural element and the second rigid component are coupled together at one or more other connection points on the second plane, and wherein the second flexural element is axially offset from the first flexural element by the fixed height of the first and second rigid components;
a first housing component coupled to the first rigid component;
a second housing component coupled to the second rigid component;
one or more sensors;
one or more processors; and
a computer-readable medium having stored thereon program instructions that, when executed by the one or more processors, cause the robotic system to perform functions comprising:
receiving, from the one or more sensors, sensor data indicating one or more deflections between the first rigid component and the second rigid component resulting from an applied load; and
determining at least one component of a force or a moment of the applied load based on the one or more deflections.

20. The robotic system of claim 19, further comprising:
an end effector coupled to the first housing component; and
a robot arm coupled to the second housing component, wherein the computer-readable medium having stored thereon program instructions that, when executed by the one or more processors, cause the robotic system to perform additional functions comprising:
altering operation of at least one of the end effector or the robot arm based on the at least one determined component of the force or the moment of the applied load.

* * * * *